United States Patent [19]

Narendranath et al.

[11] Patent Number: 5,751,434
[45] Date of Patent: May 12, 1998

[54] AREA DEPENDENT DRAFT PRINTING SYSTEM

[75] Inventors: Nagesh H. Narendranath; Fritz F. Ebner, both of Rochester, N.Y.

[73] Assignee: Xerox Corporation, Stamford, Conn.

[21] Appl. No.: 884,399

[22] Filed: Jun. 27, 1997

[51] Int. Cl.⁶ .............................. H04N 1/40; H04N 1/46
[52] U.S. Cl. ...................... 358/298; 358/448; 358/530
[58] Field of Search ................................ 358/296, 298, 358/300, 448, 518, 519, 530; 347/131, 133, 251, 254; 399/27

[56] References Cited

U.S. PATENT DOCUMENTS

| | | | |
|---|---|---|---|
| 5,245,417 | 9/1993 | Hibi et al. | 358/518 X |
| 5,257,116 | 10/1993 | Suzuki | 358/448 X |
| 5,309,258 | 5/1994 | Kouno et al. | 358/530 X |

*Primary Examiner*—Eric Frahm

[57] ABSTRACT

A system for reducing toner or ink consumption in rendering images, in which reduced slope tone reproduction curve(s) or other draft/clip mode toner consumption reduction systems to render images on an object-oriented basis are used. Rendering systems including the use of single or multiple colors can be employed.

18 Claims, 5 Drawing Sheets

AREA DEPENDENT DRAFT PRINTING SYSTEM

The present invention relates to a system for reducing the consumption of toner or ink in color printers and copiers, and more particularly, to an apparatus and method for reducing the slope of the tone reproduction curve for one or more imaged separations or other wise reducing toner/ink usage according to areas such as text, graphic and pictorial objects on a printed document. Cross reference is made to co-pending Application Ser. No. 08/884,392, which is also fully incorporated herein by reference.

In the process of digital electrostatographic printing, an electrostatic charge pattern or latent image corresponding to an original or insulating medium. A viewable record is then produced by developing the latent image with particles of granulated material to form a powder image thereof. Thereafter, the visible powder image is fused to the insulating medium, or transferred to a suitable support material and fused thereto. Development of the latent image is achieved by bringing a developer mix into contact therewith. Typical developer mixes generally comprise dyed or colored thermoplastic particles of granulated material known in the art as toner particles, which are mixed with carrier granules, such as ferromagnetic granules. When appropriate, toner particles are mixed with carrier granules and the toner particles are charged tirboelectrically to the correct polarity. As the developer mix is brought into contact with the electrostatic latent image, the toner particles adhere thereto. However, as toner particles are depleted from the developer mix, additional toner particles must be supplied.

In the operation of an electrophotographic copier or printer, particularly color machines, it is highly desirable to have means for altering rendered image black and white or color saturation for a number of reasons. In the case of color printers, it is highly desirable that in certain circumstances that toner consumption be reduced, or that less saturated colors be employed in rendering certain images so as to produce a more desirable area dependent and/or object oriented draft output.

Various systems have been employed to include those set forth in the following disclosures which may be relevant to various aspects of the systems of the present invention:

U.S. Pat. No. 4,553,172 Patentee: Yamada et al. Issued: Nov. 12, 1985

U.S. Pat. No. 4,521,805 Patentee: Ayata et al. Issued: Jun. 4, 1985

EPO-0 665 675 A2 Applicant: Hewlett-Packard Company Priority Date: Jan. 27, 1994

U.S. Pat. No. 4,553,172 discloses scanning and recording an original picture and a character document so as to produce a reproduce synthesized from said picture and said document, picture signals and character signals both generated by the scanning are arranged in data formats of the same word length.

U.S. Pat. No. 4,521,805 discloses a printing apparatus which has at least one first recording head and at least one second recording head. These recording heads allow recording in binary mode, halftone mode, normal mode, and fine mode. A printing system has at least two recording units. One recording unit has a plurality of recording heads for recording in yellow, cyan and magenta, and the other recording unit has a recording head for recording in black.

EPO-0 665 675 A2 discloses a color printer system whereby an interactive user interface allows a choice between single button automatic control of color output or multibutton control of color output, with both automatic and manual options providing independent control for color halftoning and for color correction based on the types of objects to be printed.

In accordance with one aspect of the present invention, there is provided a printing system for differentially printing image areas on an output sheet, the system includes: at least one lookup table stored in memory, said lookup table including a draft mode for processing digital images at less than a maximum density; a controller for invoking the use of the draft mode lookup table according to at least one of a plurality of object image types; and a print engine for rendering an output image with the at least one draft mode lookup table.

In accordance with another aspect of the present invention, there is provided a method for reducing toner consumption in a printing system while rendering a image area on an output sheet according to a set of digitized pixels on an object-oriented basis. The method includes providing a draft mode for invoking a first reduced slope draft mode tone reproduction curve; employing said reduced slope draft mode tone reproduction curve to render at least one separation of an image on a by-object basis in which the tone reproduction curve has less than a maximum density for a standard tone reproduction curve; and producing an output image with the reduced slope tone reproduction curve.

Other features of the present invention will become apparent as the following description proceeds and upon reference to the drawings, in which:

While the present invention will hereinafter be described in connection with preferred embodiments thereof, it will be understood that it is not intended to limit the invention to these embodiments. On the contrary, it is intended to cover all alternatives, modifications and equivalents, as may be included within the spirit and scope of the invention as defined by the appended claims.

Figure 6:
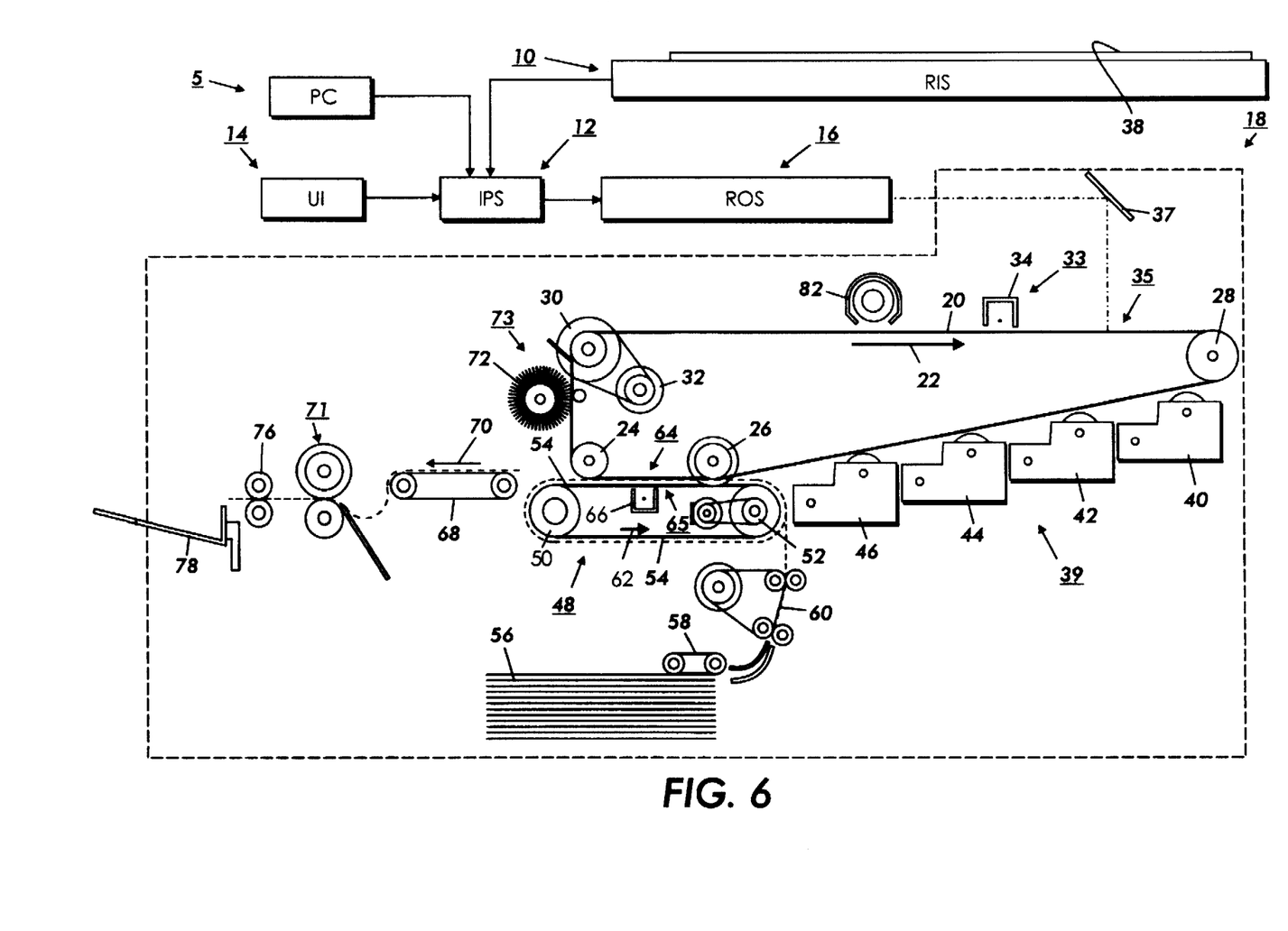
FIG. 6 is a schematic elevational view showing an exemplary color xerographic printing/copying machine and networked PC system incorporating features of the present invention therein.

For a general understanding of the features of the present invention, reference is made to the drawings. FIG. 6 is a schematic elevational view showing an exemplary electrophotographic printing/copying machine and a networked PC which may incorporate features of the present invention therein. It will become evident from the following discussion that the system of the present invention is equally well suited for use in a wide variety of printing and copying systems, and therefore is not limited in application to the particular system(s) shown and described herein. An ESS (electronic subsystem) or image processing station (both referred to as IPS), indicated generally by the reference numeral 12, contains data processing and control electronics which prepare and manage the image data flow to a raster output scanner (ROS), indicated generally by the reference numeral 16. A network of one or more personal computers (PC), indicated generally by the reference numeral 5, is shown interfacing/in communication with IPS 12. A user interface (UI), indicated generally by the reference numeral 14, is also in communication with IPS 12.

UI 14 enables an operator to control and monitor various operator adjustable functions and maintenance activities. The operator actuates the appropriate keys of UI 14 to adjust the parameters of the copy. UI 14 may be a touch screen, or any other suitable control panel, providing an operator interface with the system. The output signal from UI 14 is transmitted to IPS 12. UI 14 may also display electronic documents on a display screen (not shown in FIG. 6), as well as carry out the image rendering system of the present invention as described in association with FIGS. 1 through 4 below.

As further shown in FIG. 6, a multiple color original document 38 may be positioned on (optional) raster input scanner (RIS), indicated generally by the reference numeral 10. The RIS contains document illumination lamps, optics, a mechanical scanning drive, and a charge coupled device (CCD array) or full width color scanning array. RIS 10 captures the entire image from original document 38 and converts it to a series of raster scan lines and moreover measures a set of primary color densities, i.e., red, green and blue densities, at each point of the original document. RIS 10 may provide data on the scanned image to IPS 12, indirectly to PC 5 and/or directly to PC 5.

Documents in digital or other forms may be created, screened, modified, stored and/or otherwise processed by PC 5 prior to transmission/relay to IPS 12 for printing on printer 18. The display of PC 5 may show electronic documents on a screen (not shown in FIG. 6). IPS 12 may include the processor(s), memory, lookup tables and controller(s) (not shown in FIG. 6) which may be required to perform the clip and draft image rendering system of the present invention.

IPS 12 also may transmit signals corresponding to the desired electronic or scanned image to ROS 16, which creates the output copy image. ROS 16 includes a laser with rotating polygon mirror blocks. The ROS illuminates, via mirror 37, the charged portion of a photoconductive belt 20 of a printer or marking engine, indicated generally by the reference numeral 18, at a rate of about 400 pixels per inch, to achieve a set of subtractive primary latent images. (Other implementations may include other pixel resolutions of varying types 600×600 dpi, 1200×1200 dpi or even asymmetrical resolutions, such as 300×1200 dpi.) The ROS will expose the photoconductive belt to record three or four latent images which correspond to the signals transmitted from IPS 12. One latent image is developed with cyan developer material. Another latent image is 30 developed with magenta developer material and the third latent image is developed with yellow developer material. A black latent image may be developed in lieu of or in addition to other (colored) latent images. These developed images are transferred to a copy sheet in superimposed registration with one another to form a multicolored image on the copy sheet. This multicolored image is then fused to the copy sheet forming a color copy.

With continued reference to FIG. 6, printer or marking engine 18 is an electrophotographic printing machine. Photoconductive belt 20 of marking engine 18 is preferably made from a photoconductive material. The photoconductive belt moves in the direction of arrow 22 to advance successive portions of the photoconductive surface sequentially through the various processing stations disposed about the path of movement thereof. Photoconductive belt 20 is entrained about rollers 23 and 26, tensioning roller 28, and drive roller 30. Drive roller 30 is rotated by a motor 32 coupled thereto by suitable means such as a belt drive. As roller 30 rotates, it advances belt 20 in the direction of arrow 22.

Initially, a portion of photoconductive belt 20 passes through a charging station, indicated generally by the reference numeral 33. At charging station 33, a corona generating device 34 charges photoconductive belt 20 to a relatively high, substantially uniform potential.

Next, the charged photoconductive surface is rotated to an exposure station, indicated generally by the reference numeral 35. Exposure station 35 receives a modulated light beam corresponding to information derived by RIS 10 having multicolored original document 38 positioned thereat. The modulated light beam impinges on the surface of photoconductive belt 20. The beam illuminates the charged portion of the photoconductive belt to form an electrostatic latent image. The photoconductive belt is exposed three or four times to record three or four latent images thereon.

After the electrostatic latent images have been recorded on photoconductive belt 20, the belt advances such latent images to a development station, indicated generally by the reference numeral 39. The development station includes four individual developer units indicated by reference numerals 40, 42, 44 and 46. The developer units are of a type generally referred to in the art as "magnetic brush development units." Typically, a magnetic brush development system employs a magnetizable developer material including magnetic carrier granules having toner particles adhering triboelectrically thereto. The developer material is continually brought through a directional flux field to form a brush of developer material. The developer material is constantly moving so as to continually provide the brush with fresh developer material. Development is achieved by bringing the brush of developer material into contact with the photoconductive surface. Developer units 40, 42, and 44, respectively, apply toner particles of a specific color which corresponds to the complement of the specific color separated electrostatic latent image recorded on the photoconductive surface.

The color of each of the toner particles is adapted to absorb light within a preselected spectral region of the electromagnetic wave spectrum. For example, an electrostatic latent image formed by discharging the portions of charge on the photoconductive belt corresponding to the green regions of the original document will record the red and blue portions as areas of relatively high charge density on photoconductive belt 20, while the green areas will be reduced to a voltage level ineffective for development. The charged areas are then made visible by having developer unit 40 apply green absorbing (magenta) toner particles onto the electrostatic latent image recorded on photoconductive belt 20. Similarly, a blue separation is developed by developer unit 42 with blue absorbing (yellow) toner particles, while the red separation is developed by developer unit 44 with red absorbing (cyan) toner particles. Developer unit 46 contains black toner particles and may be used to develop the electrostatic latent image formed from a black and white original document. Each of the developer units is moved into and out of an operative position. In the operative position, the magnetic brush is substantially adjacent the photoconductive belt, while in the nonoperative position, the magnetic brush is spaced therefrom. During development of each electrostatic latent image, only one developer unit is in the operative position, the remaining developer units are in the nonoperative position.

After development, the toner image is moved to a transfer station, indicated generally by the reference numeral 65. Transfer station 65 includes a transfer zone, generally indicated by reference numeral 64. In transfer zone 64, the toner image is transferred to a sheet of support material, such as plain paper amongst others. At transfer station 65, a sheet transport apparatus, indicated generally by the reference numeral 48, moves the sheet into contact with photoconductive belt 20. Sheet transport 48 has a pair of spaced belts 54 entrained about a pair of substantially cylindrical rollers 50 and 53. A sheet gripper (not shown in FIG. 5) extends between belts 54 and moves in unison therewith. A sheet 25 is advanced from a stack of sheets 56 disposed on a tray. A friction retard feeder 58 advances the uppermost sheet from stack 56 onto a pre-transfer transport 60. Transport 60 advances the sheet (not shown in FIG. 5) to sheet transport 48. The sheet is advanced by transport 60 in synchronism with the movement of the sheet gripper. The sheet gripper then closes securing the sheet thereto for movement therewith in a recirculating path. The leading edge of the sheet (again, not shown in FIG. 6) is secured releasably by the sheet gripper. As belts 54 move in the direction of arrow 62, the sheet moves into contact with the photoconductive belt, in synchronism with the toner image developed thereon. In transfer zone 64, a corona generating device 66 sprays ions onto the backside of the sheet so as to charge the sheet to the proper magnitude and polarity for attracting the toner image from photoconductive belt 20 thereto. The sheet remains secured to the sheet gripper so as to move in a recirculating path for three cycles. In this way, three or four different color toner images are transferred to the sheet in superimposed registration with one another.

One skilled in the art will appreciate that the sheet may move in a recirculating path for four cycles when under color black removal is used. Each of the electrostatic latent images recorded on the photoconductive surface is developed with the appropriately colored toner and transferred, in superimposed registration with one another, to the sheet to form the multicolored copy of the colored original document. After the last transfer operation, the sheet transport system directs the sheet to a vacuum conveyor 68. Vacuum conveyor 68 transports the sheet, in the direction of arrow 70, to a fusing station, indicated generally by the reference numeral 71, where the transferred toner image is permanently fused to the sheet. Thereafter, the sheet is advanced by a pair of rolls 76 to a catch tray 78 for subsequent removal therefrom by the machine operator.

The final processing station in the direction of movement of belt 20, as indicated by arrow 22, is a photoreceptor cleaning apparatus, indicated generally by the reference numeral 73. A rotatably mounted fibrous brush 72 may be positioned in the cleaning station and maintained in contact with photoconductive belt 20 to remove residual toner particles remaining after the transfer operation. Thereafter, lamp 82 illuminates photoconductive belt 20 to remove any residual charge remaining thereon prior to the start of the next successive cycle. As mentioned above, the present invention is useful in xerographic printer hardware implementations (in which certain aspects of the system as outlined below have been tested) as well as other systems such as ink jet printers, plotters, computer displays or other systems.

In conjunction with FIGS. 1 through 5, the present invention will be generally be described in terms of its application to a printer or copier such as described above in association with FIG. 6. The descriptions that follow describe a embodiments of the present invention as may be implemented in a print engine that accepts a description of a page to be printed using various page description languages (PDLs). References herein to "printing" and other such terms that might otherwise be restricted to printed media applications are to be understood in the context of the broad applicability of the present invention to one skilled in the relevant arts or image processing in printing, visual output displays and like rendered media. Further, as shall be discussed later, embodiments of the invention which do not require that an image or document be described by a particular page description language (PDL) can also be applied with embodiments of the present invention.

The present invention describes a system and method for employing an ink or toner savings or economy mode for draft printing black and white and/or color documents. The desirability of including one or more draft printing/copying modes to render output documents has become more and more important as a desired user feature. When a less than optimized image quality output is suitable for internal document review or revision by a user, significant time, cost and/or printer/copier maintenance savings can be enjoyed by providing such draft modes of operation. As will become evident as described below, lower toner (or ink) usage rates can in addition to saving toner and ink, provide a variety of positive effects on the use of other consumables as well as the frequency of maintenance operations on a per-page basis. For example, not only will toner savings be enjoyed in a xerographic printer/copier when toner is used at a reduced rate per page, there may be less stress/demand on residual toner cleaning systems (having to deal with lower toner usage levels), extended life of a fusing system an/or parts (being required to fuse less toner) and many others. For these and other reasons, effective reduced toner/ink consumption draft modes that will be selected by users without destroying output image quality are highly desirable.

The present invention provides this ability to offer one or more draft modes that save toner or ink for color and/or black and white documents while producing documents of highly acceptable if not adjustable draft output quality. For example, the system of the present invention can save toner or ink while still producing smooth gray level transitions in business graphic "sweeps" (regions of graduatingly increasing or decreasing gray level density). Even draft mode color documents can be produced with minimized hue shifts such that image quality is maintained at a base level while printing/copying in a draft mode.

Figure 1:
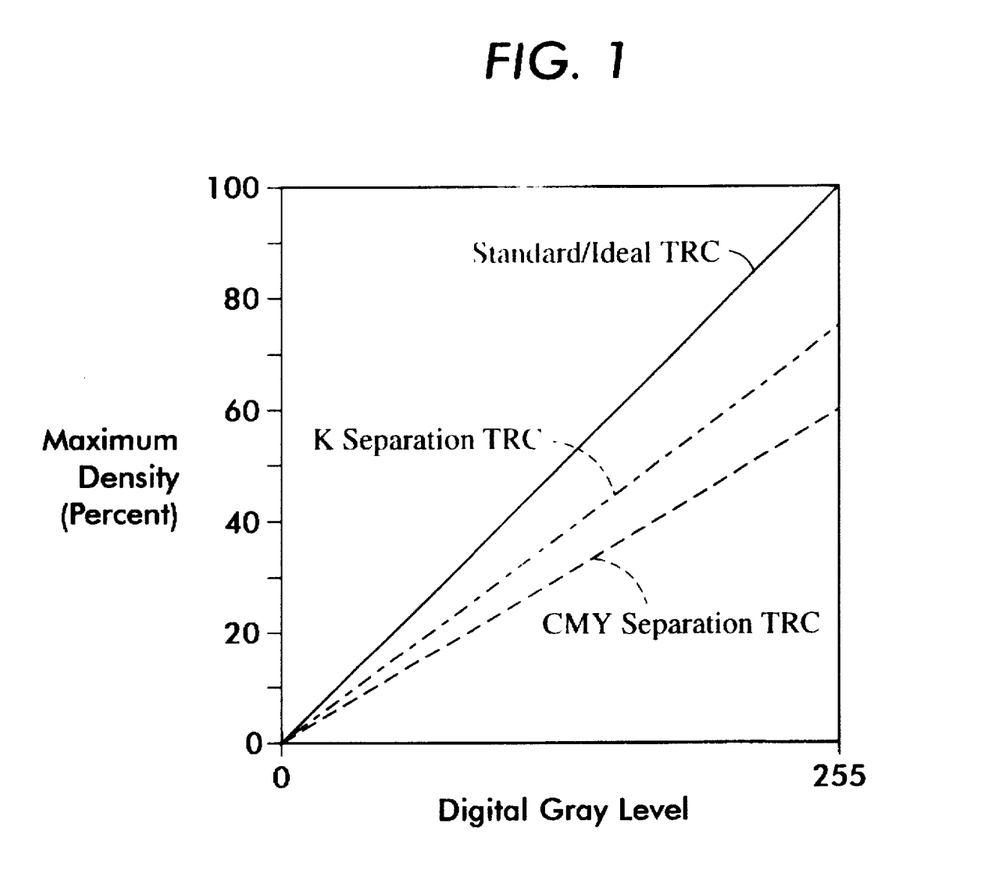
FIG. 1 is a graph comparing an exemplary standard tone reproduction curve to a set of reduced slope tone reproduction curves.
Figure 5:
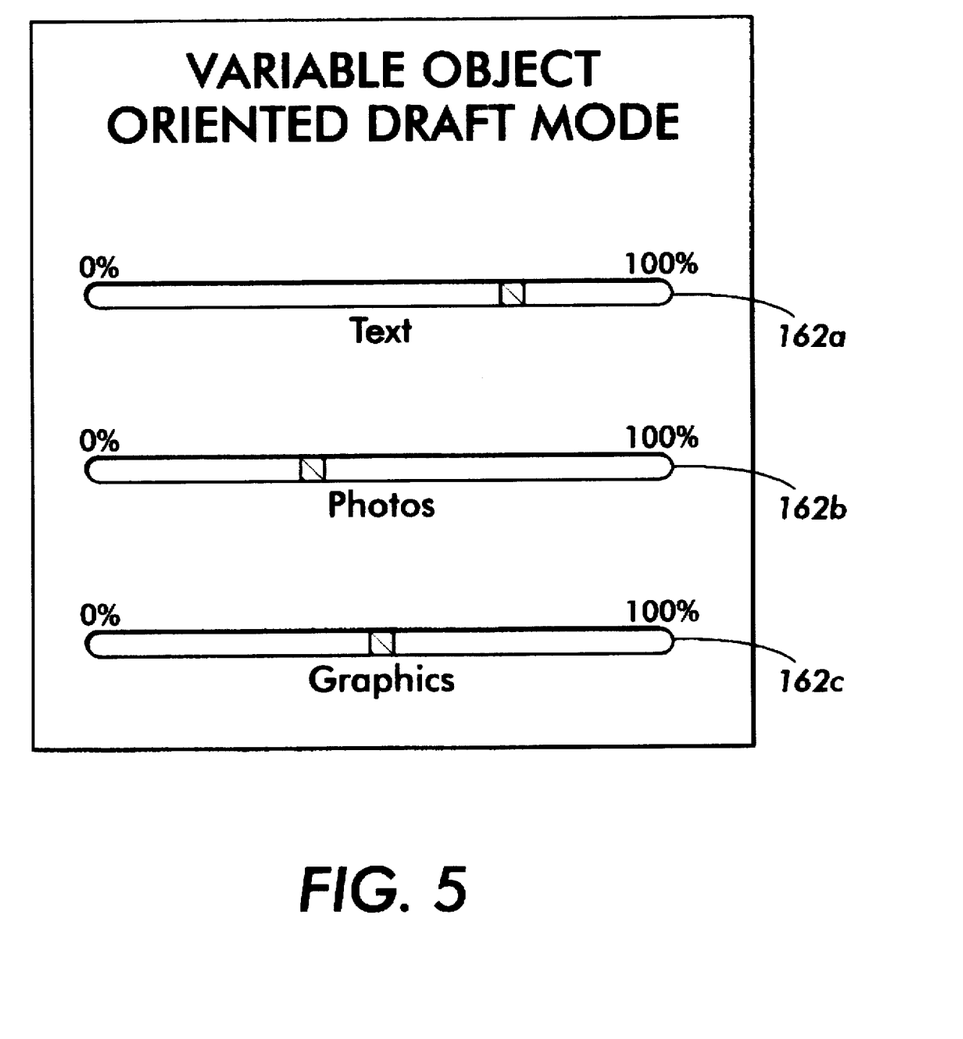
FIG. 5 is an exemplary user interface display for selecting variable object oriented draft mode embodiments of the present invention.

FIG. 1 shows a series of tone reproduction curves that show a representative "Standard or 'Ideal' TRC" with an exemplary "K[black] Separation TRC" and an exemplary "C, M, Y [cyan, magenta, yellow] Separation TRC" as may be employed in one embodiment of the present invention. (Note: FIG. 1 shows only a set of representative "straight line" TRCs; many various curved, customized and additional TRCs may be used in accordance with certain embodiments of the present invention, some of which will be described below, without departing from the spirit and scope of the present invention.) An exemplary printer (such as shown in FIG. 5) may be capable of rendering at up to 256 gray levels. FIG. 1 includes a standard or ideal TRC with no toner on the document at a density value of zero to up to a full or maximum (100%) color density of C, M, Y, K at 255. As also shown in FIG. 1, the slope and/or maximum density of one or more TRC(s) can be altered in order to change the amount of toner that could be printed on the document. A cluster dot halftone screen (not shown, but such as described in Application Ser. No. 08/786,470 entitled "Stochastically Clustered Dot Halftoning System", also assigned to Xerox)

may be used to describe and/or demonstrate successful toner savings using the TRC modification system of the present invention. In one embodiment, the cyan, magenta and yellow dots may have a line frequency of ~102 lpi, and the black dot may have a frequency of ~106 lpi. As shown in FIG. 1, the tone response curves in one embodiment are changed from the standard or ideal (ranging from 0 all the way to 100%) to a 60% of maximum for the C, M and Y separations and to a 75% maximum for the K separation. The use of these altered TRCs produces a toner savings of ~50% in the CMY planes and ~20% in K plane. In other embodiments, different alterations to the slope of the tone response curves can be made to attain different levels of toner savings and image quality.

The TRC modifications shown in FIG. 1 were determined to produce significant reductions in cyan, magenta and yellow toner use; while the K plane reductions are less pronounced, by raising the maximum density of the TRC for the K separation to 75% (above the C, M, Y maximum of 60%), undesirable deterioration of black text and similar solid black image areas is avoided. Demonstrations and tests have shown that when text density drops below certain levels, it may become difficult to read or otherwise result in undesirable or unacceptable draft image quality. At the same time, the system of the present invention renders business graphic sweeps with minimized abrupt (undesirable) transitions along the modified tonal scale. Undesirable hue shifts are likewise attained by employing the TRC modification draft rendering system of the present invention. Modification of the TRCs used for one or more color separations is just one of the methods that can be employed in conjunction with the present invention; other methods, such as the "Printer Pixel Size and Toner/Ink Consumption Reduction System" of U.S. application Ser. No. 08/720,101, filed on Sep. 27, 1997 and also assigned to Xerox may also be used to in conjunction with certain embodiments of the present invention, and is incorporated fully herein by reference.

Figure 2:
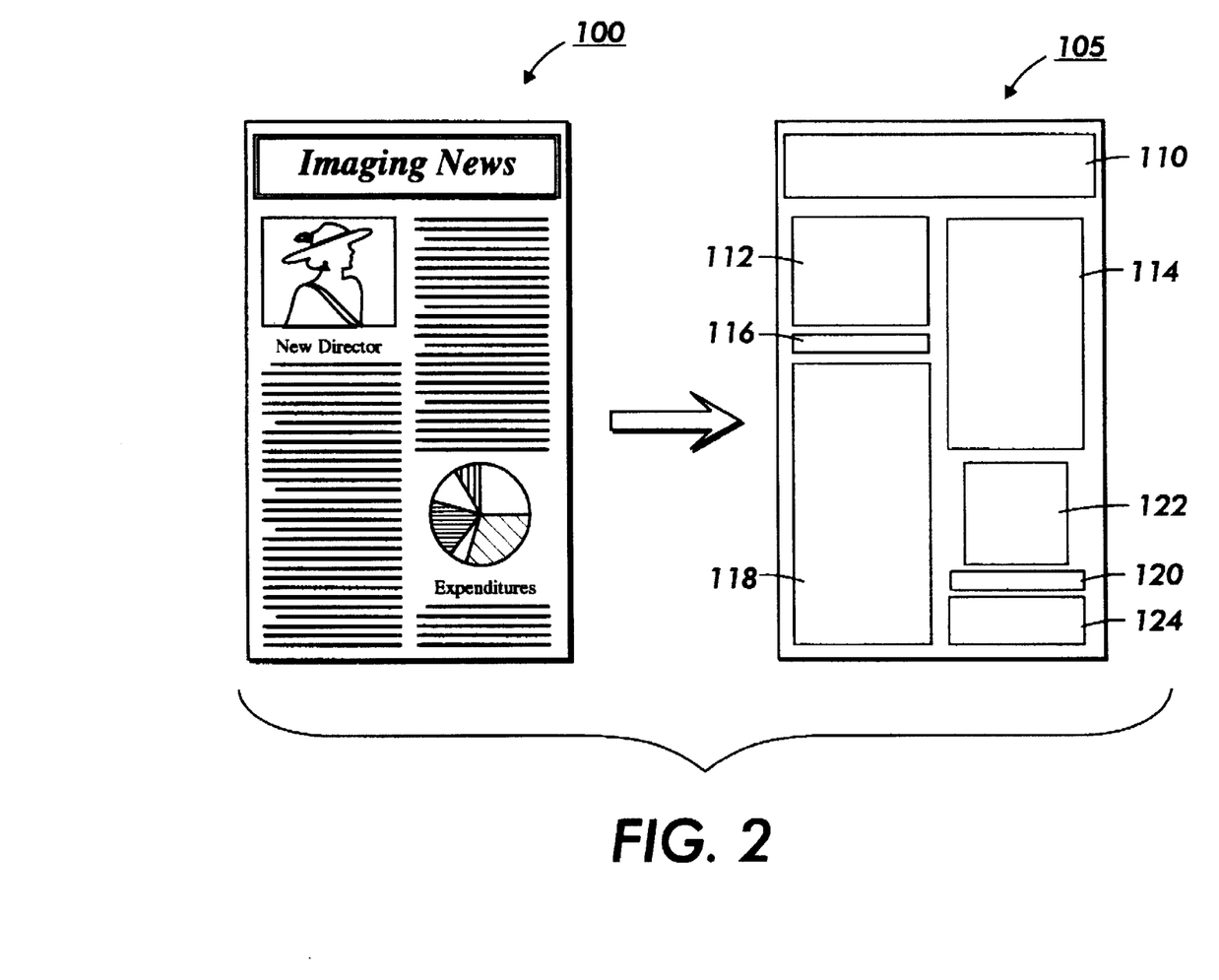
FIG. 2 is an exemplary output showing the transition from an original color document to a reduced toner/ink consumption output.

FIG. 2 shows a progression of an original image 100 into draft document 105. The effect of the various embodiments of the present invention on these draft document 105 image areas for embodiments of the present invention will be generally described for each of those embodiments of the present invention. Generally speaking, the areas of draft document 105 may be described as graphic areas 110, 116, 120 and 122; pictorial area 112; and text areas 112, 114, 118 and 124. (Depending on the particular fonts or image classifications used by a particular page description language, the title block areas of original document 100 (areas 110, 116 and 120 of draft document 105) may be rendered as text or as graphics if the system makes such differentiations.)

When the draft mode TRCs of FIG. 1 are provided or selected (75% maximum for the K separation, 60% maximum for the C, M, Y separations), the solid black areas of draft document 105 (such as black title text areas 110, 116 and 120, as well as black text 112, 114, 118 and 124) are printed at 75% density according to the K separation TRC of FIG. 1. Colored graphic area 122 and pictorial area 112 of draft document 105 are printed with up to 60% density of each of the color separation C, M, Y shown in the C, M, Y separation TRC of FIG. 1, as well as the appropriate undercolor removal amount of black toner in conjunction with the reduced C, M, Y toner levels.

Figure 3:
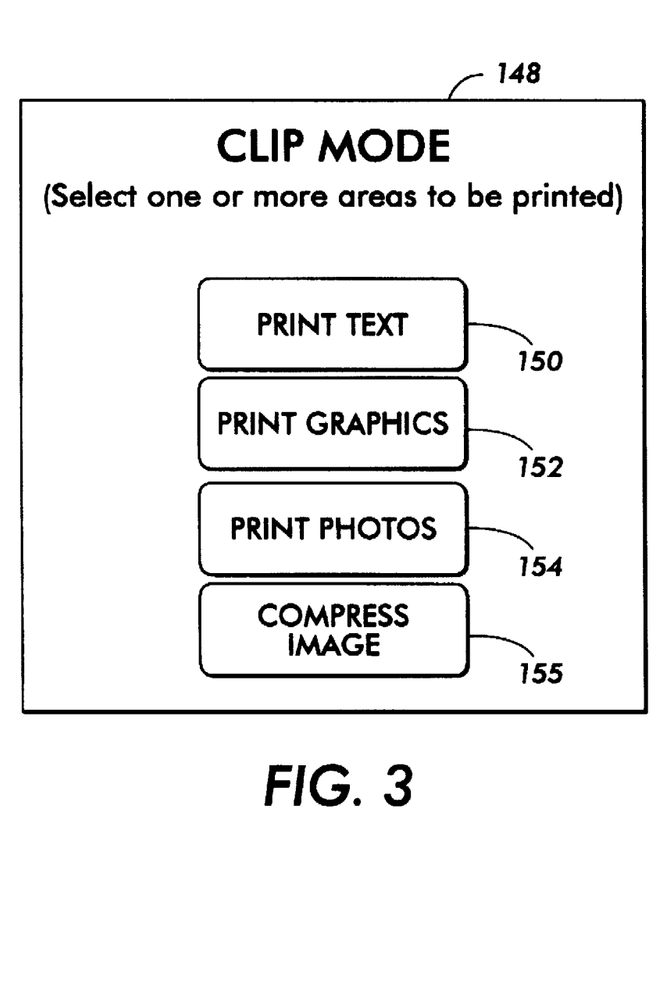
FIG. 3 is an exemplary user interface display for selecting clip mode embodiments of the present invention.

FIG. 3 shows a user interface screen block 148 including a set of "Clip Mode" options. The options on screen block 148 may be selected and used, for example, to selectively block out or generically label entire areas of text, graphic and/or photo areas when the desired draft output includes only one or two of these object types. Such clip modes can save toner, ink and other consummables, shorten image processing (RIP) time, lower job memory storage space requirements, speed printing, lower machine wear and tear, and many other advantages in situations in which a document author is only concerned with the appearance of less than all image areas on a document. For example, if the author only wishes to print the photos and or graphics in a document, or merely wishes to proof the written (text) portions of the document, other aspects of the document may be eliminated or printed in a variety of draft modes.

With continued reference to FIG. 3, aspects of "Clip Modes" of the present invention may be selectively or collectively activated. Text only printing may be initiated by the selection of "Print Text" button 150, such that only text areas 112, 114, 118 and 124 are rendered in a output document, with the other areas not being imaged (that is, remaining blank). In an alternative embodiment, an icon or other object type identification (such as a portrait-indicating icon, the printed word "Photo" or a predesignated pattern) may be rendered once in region 112; likewise, another icon or object type identification ("Graphic") may appear in regions 110, 116, 120 and 122 of the rendered document. When the "Print Graphics" option is initiated by selecting button 152 of FIG. 3 display, only image areas 110, 116, 120 and 122 of draft document 105 are printed. When the "Print Photos" option is initiated by selecting button 154 of FIG. 3 display, only image area 112 of draft document 105 is imaged, with the text and graphic image areas again being identified on the digital document by icons or words. Finally, for those image area types not to be printed, by depressing the "Compress Image" button 155, the eliminated text, graphic and/or pictorial image portions are cut out of the draft, with the remaining image area portions being compressed into the minimum number of pages that can be used to print the images at full size.

Figure 4:
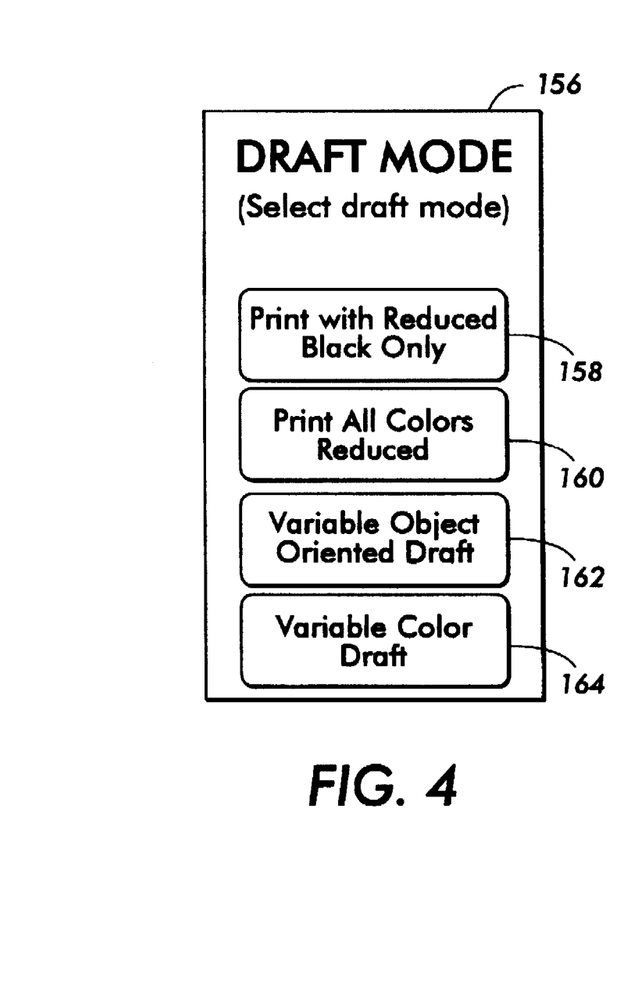
FIG. 4 is an exemplary user interface display for selecting draft mode embodiments of the present invention.

FIG. 4 shows a user interface screen block 156 that includes a set of "Draft Mode" options that may be selected by a user for use in conjunction with the "Clip Mode" selections. When "Print With Reduced Black Only" button 158 is pressed, the portions of draft document 105 (as selected according the Clip Mode") are printed in black only, with a 75% maximum for the use of black in otherwise solid black areas. In this manner, solid black text areas 112, 114, 118, and 124 as well as solid black graphic (or text) areas 110, 116, and 120 appear as 75% density gray areas. In this "Print With Reduced Black Only" embodiment, when the "Print Text" button 150 and "Print Photos" button 154 are selected, photo area 112 and graphic areas 110, 116, 120 and 122 will appear only as the black (undercolor removal) density of these document areas. This mode may be particularly useful, in that only the black separation is printed, lowering toner usage, raster image processing time, and in the case of a multi-pass color printer or copier such as shown in FIG. 6, print/copy output time. The "Print With Reduced Black Only" mode can be used when the user is only concerned with the text draft portions of the draft document 105 image, or with only relative placement of the color portions (such as graphic and photo) aspects of the draft document.

With continued reference to FIG. 4, by selecting button 160 on draft mode user interface screen 156, the black and color separation tone reproduction curves are attenuated by a predetermined amount, such as the 75% maximum density black separation and 60% maximum density cyan, magenta and yellow separation tone reproduction curve densities as shown in FIG. 1 are used in the selected Clip Mode (text, graphic and pictorial) areas. A user may select button 162 "Variable Object Oriented Draft" in order to vary the TRC's applied to the various object types that appear on a document. When button 162 is depressed, in one embodiment a preset set of reduced slope/density object-oriented reduced slope/maximum density TRCs may be employed. Alternatively, a "Variable Object Oriented Draft Mode" user interface screen may appear such as shown in FIG. 5. Using this FIG. 5 screen, a user may customize the TRCs applied to the various object types (such as text, photos and graphics) according to slide controls 162a, 162b and 162c as shown in FIG. 5.

With further reference to FIG. 4, when the "Variable Color Draft" mode button 164 is selected, a subsequent user interface screen (such as shown as FIG. 4 of application Ser. No. (D/97$$$), again incorporated fully herein by reference), whereby the user may adjust the density of the object to be imaged according to a slide control presented for each separation (not shown in the present application). As with other embodiments described above, when an object oriented Clip Mode selection (FIG. 3) is made, the various object types may be rendered according to a set of variable TRCs selected with "Variable Color Draft" mode button 164 of FIG. 4.

Other modifications and implementations of the area dependent/object oriented system of the present invention in which different TRC slopes, degrees of toner reduction and other modifications are envisioned by the system of the present invention and may be automatically or manually implemented according to user preference.

While present invention has been described in conjunction with various embodiments, it is evident that many alternatives, modifications, and variations will be apparent to those skilled in the art. Accordingly, it is intended to embrace all such alternatives, modifications, and variations as fall within the spirit and broad scope of the appended claims.

We claim:

1. A printing system for differentially printing image areas on an output sheet, comprising:

a memory including at least one lookup table having a draft mode for processing digital images at less than a maximum density;

a controller for invoking the use of the draft mode lookup table according to at least one of a plurality of object image types and a print engine for rendering an output image with the at least one draft mode lookup table.

2. The printing system of claim 1, wherein said plurality of object image types include text image objects, graphic image objects and bitmap image objects.

3. The printing system of claim 1, wherein the at least one lookup table includes a draft mode tone reproduction curve for invoking a first reduced slope draft mode tone reproduction curve having less than the maximum density for a standard tone reproduction curve.

4. A method for reducing toner consumption in a printing system while rendering a image area on an output sheet according to a set of digitized pixels on an object-oriented basis, said method comprising:

providing a draft mode for invoking a first reduced slope draft mode tone reproduction curve;

employing said reduced slope draft mode tone reproduction curve to render at least one separation of an image on a by-object basis, said tone reproduction curve having less than a maximum density for a standard tone reproduction curve; and producing an output image with the reduced slope tone reproduction curve.

5. The method of claim 4, wherein a maximum density of the first reduced slope draft mode tone reproduction curve is 75% of the standard tone reproduction curve.

6. The method of claim 4, further comprising:

providing a second reduced slope draft mode tone reproduction curve for rendering at least one separation of a multicolor color image, said tone reproduction curve having less than a maximum density for a standard tone reproduction curve and a maximum density unequal to the first reduced slope draft mode tone reproduction curve.

7. The method of claim 6, wherein the first reduced slope draft mode tone reproduction curve has a maximum density of 75% of the standard tone reproduction curve and the second reduced slope draft mode tone reproduction curve has a maximum density of 60% of the standard tone reproduction curve.

8. The method of claim 7, wherein the first reduced slope draft mode tone reproduction curve is employed to render the black separation of an image and wherein the second reduced slope draft mode tone reproduction curve is employed to render the cyan, magenta and yellow separations of an image.

9. The method of claim 4, wherein the first reduced slope draft mode tone reproduction curve is employed to render the black separation of an image.

10. The method of claim 4, wherein the first reduced slope draft mode tone reproduction curve is employed to render a set of non-black separations of a color image.

11. The method of claim 4, wherein a predetermined slope of the first reduced slope draft mode tone reproduction curve is variable.

12. The method of claim 6, wherein a predetermined slope of the second reduced slope draft mode tone reproduction curve is variable.

13. The method of claim 4, wherein a set of four reduced slope draft mode tone reproduction curves are used to respectively render each cyan, magenta, yellow and black separation of a four color image.

14. The method of claim 4, wherein the first reduced slope draft mode tone reproduction curve is employed to render the black separation only of a multicolor image including undercolor removal portions of said color image.

15. The method of claim 4, wherein the first reduced slope draft mode tone reproduction curve is used to render one of a plurality of object types.

16. The method of claim 15, wherein the plurality of object types include text objects, graphic objects and pictorial objects.

17. The method of claim 15, wherein at least one of the plurality of object types is clipped for exclusion from the output image.

18. The method of claim 17, wherein the output image is compressed to exclude unutilized areas according to the clipped object types.

* * * * *